United States Patent Office 3,142,697
Patented July 28, 1964

3,142,697
PRODUCTION OF LOWER ALIPHATIC NITRILES
Thomas J. Jennings, Lafayette, and Hervey H. Voge, Berkeley, Calif., assignors to Shell Oil Company, New York, N.Y., a corporation of Delaware
No Drawing. Filed May 31, 1961, Ser. No. 113,626
3 Claims. (Cl. 260—465.3)

This invention relates to the production of lower aliphatic nitriles. The invention relates more particularly to the production of acrylonitrile and methacrylonitrile from ammonia and propylene or isobutylene, respectively.

Methods disclosed heretofore directed to the production of nitriles include the reaction of alpha,beta-unsaturated aldehydes with ammonia in the presence of oxygen and specific catalytic materials. This makes necessary a source of the aldehydic starting material or the availability of a method for its initial production. Other methods rely upon the reaction of acetylene with hydrogen cyanide. Still another method relies upon the reaction of olefinic hydrocarbons with ammonia in the presence of oxygen and certain catalytic materials. Highly desirable with regard to practical scale production of these nitriles is the reliance upon olefins, rather than derivative products thereof, as starting materials. Processes disclosed heretofore directed to the use of an olefin as starting material are, however, often handicapped by the production of the nitrile in only relatively low yields. A particular disadvantage often inherent in such processes available heretofore is the relatively low selectivity to the desired nitriles, based upon ammonia charged, which it is possible to attain in the presence of the catalysts therein employed. Since ammonia is often the more costly of the components of the charge, suitability of the process for large scale operation is often dependent upon efficient utilization of this material. A still further difficulty often inherent in processes disclosed heretofore using an olefin as the charge, is the need to rely upon operating conditions of tempearture which, in the presence of the catalysts employed therein, generally result in substantial loss of charge and product to undesired materials.

It is an object of the present invention to provide an improved process enabling more efficient, catalytic, vapor phase production of the lower aliphatic nitriles from olefins and ammonia wherein the above difficulties are obviated to at least a substantial degree.

Another object of the invention is the provision of an improved process enabling the more efficient, catalystic, vapor phase production of lower aliphatic nitriles from olefins and ammonia enabling the attainment of substantially improved selectivity to the desired nitrile, based on ammonia charged.

A still further object of the present invention is the provision of an improved process enabling the more efficient, catalytic, vapor phase production of the lower aliphatic nitriles from olefins and ammonia wherein optimum yields of the desired nitriles are obtained at substantially reduced temperatures.

A more particular object of the invention is the provision of an improved process enabling the more efficient production of acrylonitrile and methacrylonitrile from propylene and isobutylene, respectively, and ammonia.

In accordance with the invention lower aliphatic nitriles are produced with substantially improved efficiency by reacting lower olefinic hydrocarbons having at least three carbon atoms to the molecule with ammonia in the presence of oxygen and a catalyst comprising iron in combination with phosphorus as the essential component.

Olefinic hydrocarbons reacted with ammonia in the process of the invention comprise broadly the lower olefinic hydrocarbons, for example, olefins having from three to about ten carbon atoms to the molecule. The process is applied with particular advantage to the reaction of propylene and isobutylene with ammonia to obtain acrylonitrile and methacrylonitrile, respectively. Olefinic hydrocarbons employed as charge to the process may be obtained from any suitable source. The olefins charged need not necessarily be pure and may comprise other hydrocarbons, such as, for example, paraffinc hydrocarbons normally accompanying these olefins as commercially available. Suitable olefinic charge to the process includes the normally gaseous hydrocarbons comprising propylene and/or isobutylene such as, for example, the $C_3$ and $C_4$ olefinic hydrocarbon fractions. The olefinic charge may be subjected to conventional treatment to effect the removal of undesired components therefrom and/or to effect its concentration. Such pretreatment may comprise one or more such steps, for example, drying, fractionation, distillation, selective diolefin hydrogenation, extraction, etc.

Ammonia reacted with the olefin in the process of the invention may be obtained from any suitable source. It need not necessarily be pure and may be employed in the form generally commercially available. Suitable ammonia charge to the system comprises the ammonia-containing off-gases from chemical processes which contain no substantial amount of materials which undergo substantial reaction under the conditions of the process. The ammonia charged to the system may be subjected to conventional pretreating steps directed to its purification and/or concentration. In lieu of the ammonia there may be employed nitrogen-containing compounds giving rise to the formation of ammonia in situ.

Reaction of the olefin with the ammonia is carried out in the presence of oxygen introduced into the system from an outside source and/or recycled from within the system. The oxygen reactant may be introduced into the system as relatively pure oxygen or as a dilute oxygen stream containing the oxygen in admixture with one or more normally gaseous materials such as nitrogen, argon, oxides of carbon, etc. Air may be used as the oxygen-containing charge. Comprised within the scope of the invention is the use of relatively concentrated oxygen, such as obtained by the fractionation of air.

Reaction of the olefin with the ammonia is effected in the presence of a catalyst comprising iron in combination with phosphorus as the essential components thereof. Suitable catalysts are those comprising iron, phosphorus, and oxygen. Essential to the attainment of the objects of the invention is the presence of at least a substantial part of the iron component of the catalyst in chemical combination with the phosphorus component. Thus, suitable catalysts comprise iron phosphate, iron metaphosphate, iron pyrophosphate, admixtures of one or more of these with elementary iron and/or an oxide of iron. Suitable catalysts comprise those containing at least a part of the iron in the form of a phosphide which may be oxidized to phosphate in use. The oxygen contents of these catalysts will be somewhat variable, depending on the exact conditions of use. In general, in use the oxygen will be somewhat less than that corresponding to full conversion of the elements to phosphates or higher oxides.

The suitable catalysts may be employed as such, or in combination with a catalyst support or diluent. The support employed may be inert or function to activate or otherwise modify the effect of the catalyst. Suitable catalyst support materials which may be employed comprise, for example, the aluminous and/or silicious support materials, such as, for example, alumina, bauxite, silica, silica-alumina, Porocel, etc. Examples of other suitable support or diluent materials are carborundum; silicon carbide; silicon; ceramically bonded aluminas, silicas, and carborundum; Alundum; crushed brick; etc.

The suitable iron-phosphorus-containing catalysts used in the process of the invention may comprise, in addition, other metals capable of functioning as promoters and/or modifying agents. Such suitable complementary components comprise, for example, a metal from the right-hand column of Group I and the right-hand column of Group V of the Periodic Table of Elements. Particularly suitable are one or more of the members of the following group: copper, arsenic, antimony, bismuth, silver, tin, selenium and tellurium. These complementary components are preferably present in the form of a chemical combination with phosphorus. Thus, a part or all of these added components may be present as the metaphosphate, pyrophosphate or phosphate. The presence of a part of the complementary metal as an oxide, or as a compound with iron, is however comprised within the scope of the invention. These complementary components of the catalyst such as, for example, bismuth, though found to have relatively no substantial catalyzing effect upon the desired nitrile-forming reaction, have nevertheless now been found to exert a definite promotional effect upon the primary iron-phosphorus catalyst component. The amount in which these promotors are added to the catalyst may vary within the scope of the invention. They may be employed in relatively small amounts ranging, for example, from about 0.5% to about 15% of the catalyst, or they may be employed in substantially greater amount. Thus, the iron-phosphorus catalyst may also contain the promotors in the amount ranging, for example, from about ¼ to about 2.5, and preferably from about ½ to about 1.5 atoms of the metal promotor to one atom of iron in the catalyst.

The catalysts may be prepared in any suitable manner. They may be formed directly by metathesis. A suitable iron salt and a soluble phosphate such as, for example, sodium orthophosphate may be reacted in solution to effect precipitation of iron orthophosphate. A suitable catalyst may also be prepared for example by addition of iron, and optionally one of the promotor metals, to a phosphoric acid followed by recovery of mixed phosphates. In another method an iron oxide and a promotor oxide are mixed with phosphoric acid and the mixture is heated.

In one method of preparing the promoted iron-phosphorus catalyst, a soluble salt of iron is added as an aqueous solution to an aqueous solution of a soluble salt of the promotor metal. To this mixture there is added phosphoric acid, or an ammoniacal phosphate, under conditions resulting in the precipitation of the metals in chemical combination with phosphorus. Thus, suitable catalysts may be prepared by the addition of an aqueous solution of iron nitrate to an aqueous solution of bismuth nitrate; adding ammonium acid phosphate to the resulting aqueous solution; then adding aqueous ammonium hydroxide to obtain a pH of about 5.5 followed by separation of the resulting precipitate. The precipitate is then filtered and the filter cake washed, dried and calcined. Suitable catalysts are also obtained by physical admixture of an iron phosphate with a phosphate of the promotor metal. Suitable catalysts comprise those containing more than one of the metal promotors. An effective catalyst is obtained by physical admixture of an oxide of tellurium to the promoted iron-phosphorus catalyst.

The catalysts may be formed in the presence of a part or all of any support material to be used therewith; or the support may be added to the catalyst subsequent to its preparation by simple physical admixture.

Drying of the catalyst may be carried out in an oxygen or an inert atmosphere. The resulting dried catalyst is preferably calcined before use. During the calcining operation a part of the metal compounds therein may be converted to an oxide form. This, however, has no adverse effect upon the usefulness of the catalyst. It is to be stressed, however, that though a portion of the iron and promotor metal of the catalyst may be in the form of an oxide, the greater part thereof is always present in chemical combination with phosphorus, for example, as phosphate, a metaphosphate or a pyrophosphate.

A particular advantage of the process of the invention resides in its ability to effect the reaction of the olefin with the ammonia with a high selectivity to the lower aliphatic nitrile at relatively low temperatures, thereby enabling the reaction to be carried out well below temperature conditions at which substantial decomposition of reactants and/or nitriles has heretofore been encountered. This is attributable, at least in part, to characteristics peculiar to the iron-phosphorus catalyst employed. Temperatures in the range of, for example, from about 350 to about 550° C., and preferably in the range of from about 400 to about 500° C. are generally employed.

The process is carried out at subatmospheric, atmospheric, or superatmospheric pressures. In general, it is found that the use of a slightly elevated pressure, for example, from slightly above atmospheric to about 100 p.s.i.g. is satisfactory.

In carrying out the present invention the olefinic hydrocarbon, the ammonia and the molecular oxygen components of the charge to the system are brought into contact with the iron-phosphorus catalyst in a suitable reactor. The reaction may be carried out with the use of the catalyst in the form of a stationary bed, as a dense suspended system, or as a fluidized system. The process may be executed as a batch, a semi-continuous, or a continuous operation.

The olefin and ammonia reactants, as well as the oxygen, may be introduced into the system as separate streams, or they may be admixed, in part or in entirety, before introduction into the reaction zone. One or more of these charge components may be introduced at a plurality of points along the length of the reaction zone and they may be preheated.

The introduction of the ammonia and olefin components of the charge into the reaction zone is preferably controlled to maintain the mol ratio of ammonia to olefin entering the reaction zone in the range of from about 0.5:1 to about 2:1. It is preferred to maintain the ammonia in molecular excess. Particularly preferred is the maintenance of the mol ratio of ammonia to olefin in the range of from about 1:1 to about 1.5:1.

The mol ratio of oxygen to olefin introduced into the system is maintained within the range of from about 0.5:1 to about 3:1. It is preferred to maintain a molar excess of oxygen over olefin in the charge to the reaction zone. Thus, the mol ratio of oxygen to olefin is preferably maintained above about 1:1 but not substantially in excess of about 2:1.

Water vapor may be introduced into the reaction zone although this is not essential to operation of the process within the scope of the invention. Water vapor may be employed to aid in maintaining temperature and flow conditions within the reaction zone. The amount of water vapor introduced into the system may vary within the scope of the invention. Thus, the mol ratio of water vapor to olefin in the charge may range from 0 to about 15:1. When water vapor is employed it is generally used in a mol ratio of water vapor to olefin in the range of from about 1:1 to about 5:1.

The contact time preferably employed will vary in accordance with the specific olefin undergoing reaction and the specific conditions employed. In general, a contact time in the range of from about 0.05 to about 10 seconds, and preferably from about 0.1 to about 2 seconds is employed. Longer or shorter contact may be employed within the scope of the invention.

Under the above-defined conditions olefins are reacted with ammonia with the formation of reaction products comprising the lower aliphatic nitriles corresponding to the olefin charged. Thus, propylene and isobutylene result in the obtaining of reaction products comprising acrylonitrile and methacrylonitrile, respectively. In addition to the nitriles there are generally obtained carbonylic reaction products consisting predominantly of alpha, beta-unsaturated aliphatic aldehydes corresponding to the olefins charged. Thus, when charging propylene and/or isobutylene, acrolein and methacrolein, respectively, are obtained in addition to the nitriles. A particular advantage of the invention, directly attributable to the presence of the iron-phosphorus components of the catalyst, resides in the execution of the reaction with high selectivity to the desired nitrile based upon the ammonia charged.

The reaction mixture obtained is subjected to suitable product separating means which may comprise one or more such steps as, for example, absorption, liquid phase extraction, distillation, fractionation, extractive distillation, selective adsorption, etc. Unconverted materials comprising olefins and ammonia, and optionally oxygen, are recycled at least in part to the reaction zone. The materials so recycled may be subjected to conventional treating means to effect their purification and/or concentration. Carbonylic reaction products such as those of aldehydic character and hydrogen cyanide may also be recycled.

The catalysts employed in the process of the invention will, after long period of use, become partly spent. They may be reactivated by subjection to elevated temperatures, for example, in the range of from about 200 to about 600° C., in the presence of water vapor to which phosphoric acid has been added. Such reactivation treatment may be preceded by passage through the catalyst of gaseous streams such as, for example, a hydrocarbon gas and/or oxygen-containing gas. Reactivation may be employed intermittently during the course of the process. Comprised within the scope of the invention is the bleeding of phosphoric acid into the catalyst bed of the system during the course of the process.

Agents capable of modifying the reactivity of the catalyst may be added to the catalyst during the course of the process. Thus, materials containing halides, arsenic, antimony, selenium, tellurium, etc. may be introduced into the reaction zone during the course of the reaction.

By "selectivity to nitriles based on ammonia charged" as used herein is meant the number of moles of nitrile produced times 100 divided by the number of moles of ammonia converted.

By "selectivity to nitriles based on olefin charged" as used herein is meant the number of moles of nitrile produced times 100 divided by the number of moles of olefin converted.

The following examples are illustrative of the invention.

*Example I*

A mixture of propylene, oxygen, ammonia, water vapor, and helium containing a mol ratio of $$C_3H_6:O_2:NH_3:H_2O:He$$

of 2:3:2:2:12, was passed over a catalyst consisting essentially of iron phosphate (FePO$_4$) at a temperature of 489° C., with a gas hourly space velocity (GHSV) of 3150 at atmospheric pressure. Under these conditions 14% of the propylene was reacted with a selectivity to acrylonitrile of 55% based on propylene and of 63% based on ammonia reacted.

As indicated above certain metals in combination with phosphorus, though exerting little if any catalytic effect upon the nitrile-forming reaction when used by themselves, do have a decided synergistic, or promotional, effect upon the catalysts comprising iron in combination with phosphorus. This is illustrated by the following example.

*Example II*

A catalyst "Catalyst B" consisting essentially of iron phosphate in combination with bismuth phosphate was prepared as follows:

100 ml. of aqueous iron nitrate, containing 1 mole Fe(NO$_3$)$_3$ per liter, was added to 200 ml. of aqueous bismuth nitrate, containing 1 mole Bi(NO$_3$)$_3$ per liter, to which 15 ml. of concentrated HNO$_3$ had been added. The resulting mixture was diluted to 1 liter with water. To this there was then added 1 liter of aqueous ammonium acid phosphate containing 2 moles (NH$_4$)$_2$HPO$_4$. The resulting mixture was stirred for 13 minutes. The precipitate which formed was separated by filtration; the filter cake was washed with water, dried in air, and calcined at 500° C. for a period of 2 hours. The resulting calcined material "Catalyst B" consisted essentially of iron phosphate in admixture with bismuth phosphate wherein the relative proportions of iron, bismuth and phosphorus may be represented by the empirical designation: 2 Bi,Fe,2.7P, where the numbers give the relative numbers of atoms and the amount of oxygen is not shown.

A material "Material M" consisting essentially of bismuth phosphate was then prepared from aqueous bismuth nitrate substantially under identical conditions but with the exception that the iron phosphate was omitted.

A gaseous mixture consisting of propylene, oxygen, ammonia steam and helium, containing a mol ratio of C$_3$H$_6$:O$_2$:NH$_3$:H$_2$O:He of 2:3:2:2:12 was passed over a portion of the "Catalyst B" consisting of iron phosphate in combination with bismuth phosphate, at a temperature of 424° C. and a GHSV of 3150 and atmospheric pressure. There was obtained a conversion of propylene of 44% with a selectivity to acrylonitrile of 53% based on propylene charged and 72% based on ammonia charged.

The operation was repeated under substantially identical conditions but with the exception that "Material M" consisting essentially of bismuth phosphate (containing no iron) was substituted for the iron phosphate catalyst. There was obtained a conversion of propylene of 8% with a selectivity to acrylonitrile of 17% based on propylene charged and 11% on ammonia charged.

*Example III*

A catalyst "Catalyst C" was prepared by mixing by mixing 10% by weight of TeO$_2$ to the "Catalyst B" of the foregoing Example II. Acrylonitrile was produced by passing a gaseous mixture consisting of propylene, ammonia, oxygen, water vapor and helium over the catalyst under substantially identical conditions set forth in Example II. There was obtained a conversion of propylene of 63% with a selectivity to acrylonitrile of 54% based on propylene charged and 54% based on ammonia charged.

*Example IV*

A catalyst "Catalyst D" was prepared as follows: 150 ml. of aqueous bismuth nitrate, containing 1 mole Bi(NO$_3$)$_3$ per liter, to which had been added 22 ml. of concentrated HNO$_3$, was diluted to 500 ml. with 1 N. HNO$_3$. To this there was added an aqueous solution of iron nitrate containing 0.15 mole Fe (NO$_3$)$_3$. To the resulting mixture there was then added 300 ml. of aqueous ammonium acid phosphate containing 1 mole (NH$_4$)$_2$HPO$_4$ per liter. Some precipitation occurred. There was then added 169 ml. of aqueous ammonium hydroxide bringing the pH to 5.5 and effecting the formation of a substantial amount of precipitate. The resulting precipitate was separated by filtration, washed with water and calcined at 500° C. The relative proportion of iron, bismuth and phosphorus in "Catalyst D" so prepared in represented by the empirical designation Bi,Fe,2P.

A catalyst "Catalyst E" was prepared under substantially the same conditions as indicated above in the preparation of "Catalyst D" with the exception that the proportions of starting materials were chosen to result in a final catalyst the atomic proportion of iron to phosphorus to bismuth in which is represented by the empirical designation: Bi,Fe,P.

A gaseous mixture consisting of propylene, oxygen, ammonia water vapor and helium, containing a mol ratio of $C_3H_6:O_2:NH_3:H_2O:He$ of 2:3:2:2:13, was passed over the "Catalyst D" at a temperature of 460° C., a GHSV of 3150, and atmospherica pressure. There was obtained a conversion of propylene of 50% with a selectivity to acrylonitrile of 43% based on propylene charged and of 51% based on ammonia charged.

The operation was repeated under substantially identical conditions but with the exception that "Catalyst E" was substituted for "Catalyst D", and that a temperature of 500° C. was used. A conversion of propylene of 55% was obtained, with a selectivity to acrylonitrile of 50% based on propylene charged and of 68% based on ammonia charged.

Similarly methacrylonitrile is obtained with high selectivity by the passage of isobutylene in admixture with ammonia and oxygen, over the catalysts and at the conditions defined above.

We claim as our invention:

1. The process for the production of a nitrile selected from the group consisting of acrylonitrile and methacrylonitrile which consists of reacting an olefin selected from the group consisting of propylene and isobutylene with ammonia, in a mole ratio of ammonia to said olefin in the range of from about 0.5:1 to about 2:1, in the presence of molecular oxygen in a mole ratio of oxygen to said olefin in the range of from about 0.5:1 to about 3:1, and of a catalyst consisting essentially of iron phosphate, at a temperature of from about 350 to about 550° C.

2. The process in accordance with claim 1 wherein said catalyst is employed in admixture with bismuth phosphate.

3. The process in accordance with claim 2 wherein said catalyst is promoted by the presence of tellurium dioxide.

References Cited in the file of this patent

UNITED STATES PATENTS

| 2,691,037 | Bellringer et al. | Oct. 5, 1954 |
| 2,904,580 | Idol | Sept. 15, 1959 |
| 3,009,943 | Hadley et al. | Nov. 21, 1961 |

OTHER REFERENCES

Bergmann: "Acetylene Chemistry," page 80, 1948.